(No Model.)
G. S. BRIGGS.
SEEDING MACHINE.
No. 295,480. Patented Mar. 18, 1884.
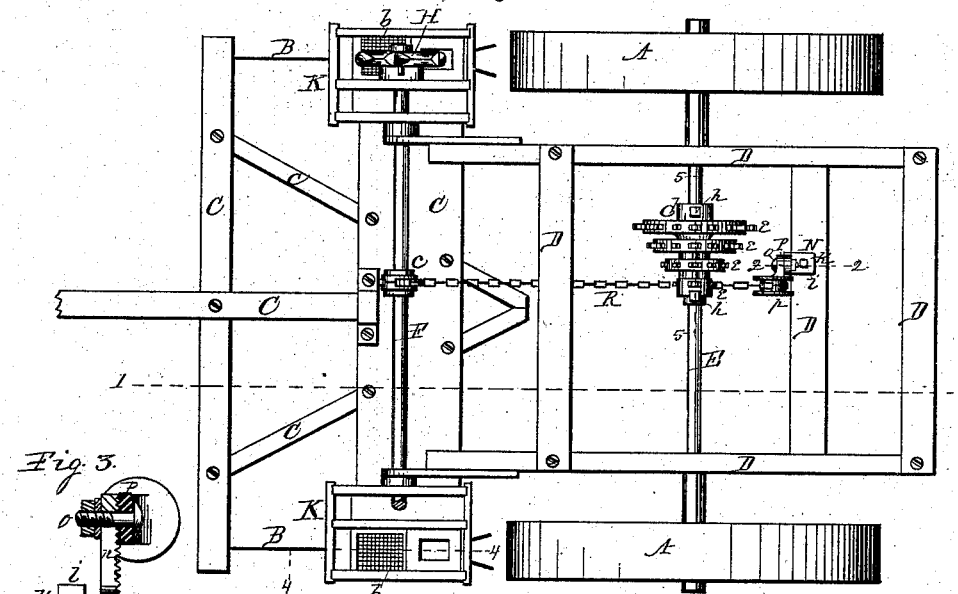
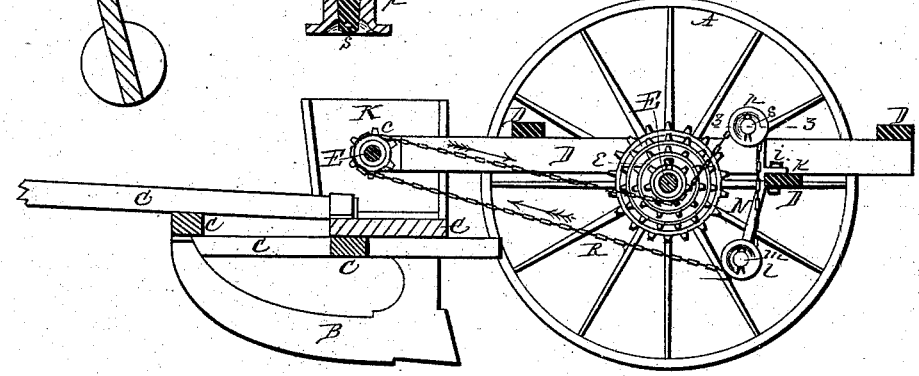
Witnesses.
A. O. Behel
J. P. Cobb
Inventor.
George S. Briggs
Per Jacob Behel
Atty

UNITED STATES PATENT OFFICE.

GEORGE S. BRIGGS, OF ROCKFORD, ILLINOIS.

SEEDING-MACHINE.

SPECIFICATION forming part of Letters Patent No. 295,480, dated March 18, 1884.

Application filed November 12, 1883. (No model.)

*To all whom it may concern:*

Be it known that I, GEORGE S. BRIGGS, a citizen of the United States, residing in the city of Rockford, in the county of Winnebago and State of Illinois, have invented new and useful Improvements in Seed-Planting Machines, of which the following is a specification.

This invention relates to that class of seed-planting machines known as "combined drill and check-row planters," in which a single grain of seed may be deposited in the furrow at equal proper intervals, or more than one grain of seed may be deposited in the furrow in hills at proper intervals.

The object of this invention is to produce a machine capable of adjustment to vary the intervals at which the seed is deposited and the quantity of seed distributed. To this end I have designed and constructed the machine represented in the accompanying drawings, in which—

Figure 1 is a plan view of a planting-machine embodying my invention. Fig. 2 is a lengthwise vertical section on dotted line 1 on Fig. 1. Fig. 3 is a vertical section on dotted line 2 on Fig. 1. Fig. 4 is a transverse section on dotted line 3 on Fig. 2. Fig. 5 is a vertical section on dotted line 4 on Fig. 1; and Fig. 6 is a vertical section on dotted line 5 on Fig. 1.

In the several figures in the drawings the carrying-wheels A, runners B, frames C and D, shafts E and F, and seed-distributing wheel H are substantially the same as like parts employed in like machines now in use and to be found in the trade, and therefore I do not deem it necessary to give a more detailed description of these several parts in this specification.

The seed-boxes represented at K are in the main substantially such as have been heretofore employed in this class of seed-planters; but in these seed-boxes I have provided an opening, *a*, in the bottom of the box under the seed-distributing wheels, and over this opening I have fixed a wire-screen, *b*, having meshes of a proper size to retain the seed and permit any dust and small particles mixed with the seed to pass through its meshes and escape from the seed-boxes, to prevent such dust or small particles from interfering with the action of the seed-distributing wheels in picking up and depositing the seed. In this instance I have represented but one seed-distributing wheel H in the seed-box in one side of the machine, but intend to employ a like seed-distributing wheel in the other seed-box on the opposite side of the machine.

The omission of the seed-wheel is for the purpose of more clearly showing the screen *b*, placed over the opening *a*.

At *c* is represented a sprocket-wheel fixed on the seed-wheel shaft F, and is fitted to receive the links of a chain-belt in the usual manner.

At *d* is represented a tubular sleeve, on which are formed or fixed a series of sprocket-wheels, *e*, suitably separated to receive a chain-belt. The sprocket-wheels *e*, composing the series, are of various diameters, producing a cone of sprocket-wheels, varying in diameter between the larger and smaller sprocket-wheels at the opposite ends of the cone. This cone of sprocket-wheels, by means of its tube-formed center sleeve, is mounted upon the shaft E of the carrying-wheels in a manner to be capable of an endwise movement thereon, for the purpose of adjustment, to place any one of the series of sprocket-wheels *e* of the cone in line with the sprocket-wheel *c* on seed-wheel shaft. This cone of sprocket-wheels, when adjusted upon its shaft, is fixed thereon to revolve with the shaft by means of set-screws *h*, having a screw-threaded connection with the sleeve, and are fitted to engage the shaft in the manner that set-screws are usually employed to fix pulleys on their shafts.

At N is represented a bracket fixed to one of the transverse bars D, of the rear frame by means of a screw-bolt, *i*, passed through a foot-flange, *k*, projecting from the rear face of the bracket and through its beam-support. This bracket N extends above and below the beam. The lower end of this bracket is provided with an idle-sheave, *l*, supported to revolve on a stud-journal, *m*, projecting laterally from the edge of the bracket. The portion of the bracket N extending above its beam-support is provided with a vertical slot at *n*, to receive a suitable bolt in such a manner as to permit it to be moved lengthwise in the slot.

At P is represented an adjustable sheave-supporting bracket fitted to engage the slotted arm of the bracket N, and is made vertically adjustable thereon. The contiguous faces of these parts are corrugated to engage each other, and a screw-bolt, o, is passed through the bracket P and through the slot n in the bracket N, and by means of a screw-nut serves to fix the parts to each other in their adjusted position.

At p is represented an idle-sheave supported to revolve on a stud-journal, s, projecting from the edge of the adjustable bracket P. These idle-sheaves l and p are designed to support a chain-belt employed to impart motion to the seed-distributing wheels.

At R is represented a chain-belt, consisting of rectangular links suitably hinge-jointed to each other, producing a flexible chain-belt with openings in its links to receive the teeth of the sprocket-wheels. This chain-belt is placed upon the sprocket-wheel c on the shaft of the seed-distributing wheels, from which its upper strand extends rearward, having its links receive the teeth on the under side of one of the sprocket-wheels e of the series forming the cone mounted on the shaft E of the carrying-wheels, thence upward and over the idle-sheave p on the adjustable bracket, thence downward under the idle-sheave l on the lower end of the sheave-supporting bracket N, thence forward under and upward over the sprocket-wheel c on the shaft of the seed-distributing-wheels, which completes the circuit.

From this construction and arrangement of the parts it will be seen that on the forward movement of the machine as employed in planting seed the chain-belt will be made to travel in the direction indicated by the arrows, which will cause the seed-distributing wheels to revolve in the opposite direction to the rotations of the carrying-wheels, to lift the seed from over the screen-bottom and deliver it from the rear end of the seed-boxes to be deposited through the open heel of the runners.

It will further be seen that by means of the adjustable sheave-supporting bracket P, which may be raised and lowered on its bracket-support N, the chain-belt may be slackened to such an extent as to be capable of use on any of the sprocket-wheels e, forming the cone; and by means of the adjustability of the cone on its shaft-support any wheel in the series may be brought into line with the movement of the belt.

By these means the machine may be adjusted to vary the quantity of seed deposited at stated intervals when employed as a check-row machine, or to vary the distance between the deposits, when employed as a drill, to any extent within the limits of the devices.

I claim as my invention—

1. The combination, in a seed-planting machine, of a sprocket-wheel cone made adjustable on the shaft of the supporting-wheels, a sprocket-wheel fixed on the seed-wheel shaft, a sheave-supporting bracket adjustably secured to a cross-bar of the machine and carrying adjustable idle-sheaves, and a chain-belt connecting the sprocket-wheel of the seed-shaft with one of the cone-wheels and passing around said idle-sheaves, substantially as set forth.

2. The combination, with a chain-belt to connect the sprocket-wheels, of adjustable idle-sheaves supported by a bracket extending both above and below the cross-bar to which it is secured, substantially as set forth.

3. The combination, with the sheave-supporting bracket N, fixed to one of the cross-bars of the frame and extending both above and below the latter, of the bracket P, adjustably secured to the bracket N, to afford a vertical adjustment for the sheave, substantially as set forth.

GEORGE S. BRIGGS.

Witnesses:
WALTER S. HAWTHORNE,
A. O. BEHEL.